United States Patent
Knipe

(10) Patent No.: US 7,477,219 B2
(45) Date of Patent: Jan. 13, 2009

(54) MICRO-MIRROR AND METHOD

(75) Inventor: Richard L. Knipe, McKinney, TX (US)

(73) Assignee: Texas Instruments Incorporated, Dallas, TX (US)

(*) Notice: Subject to any disclaimer, the term of this patent is extended or adjusted under 35 U.S.C. 154(b) by 177 days.

(21) Appl. No.: 11/430,225

(22) Filed: May 8, 2006

(65) Prior Publication Data

US 2007/0257870 A1    Nov. 8, 2007

(51) Int. Cl.
  *G09G 3/34* (2006.01)
  *G02B 26/00* (2006.01)
  *G02B 26/08* (2006.01)
(52) U.S. Cl. .............. 345/84; 345/31; 345/48; 359/291; 359/295; 359/298
(58) Field of Classification Search .......... 345/84, 345/85, 205, 206, 31, 48; 359/291, 292, 359/295, 318, 847, 850, 872, 876; 347/239; 353/98, 99; 348/770, 771
See application file for complete search history.

(56) References Cited

U.S. PATENT DOCUMENTS

| 5,535,047 | A  | * | 7/1996  | Hornbeck ............ 359/295 |
| 5,739,941 | A  | * | 4/1998  | Knipe et al. ......... 359/224 |
| 5,771,116 | A  | * | 6/1998  | Miller et al. ......... 359/295 |
| 5,867,202 | A  | * | 2/1999  | Knipe et al. ......... 347/239 |
| 6,867,897 | B2 | * | 3/2005  | Patel et al. .......... 359/291 |
| 6,980,349 | B1 | * | 12/2005 | Huibers et al. ....... 359/291 |

* cited by examiner

*Primary Examiner*—Henry N Tran
(74) *Attorney, Agent, or Firm*—Wade J. Brady, III; Frederick J. Telecky, Jr.

(57) ABSTRACT

According to one embodiment of the present invention a method of reflecting light is disclosed including providing an element having a surface having an edge on which the element is capable of rolling and selectively reflecting light by rolling the surface such that a reflective element associated with the surface selectively reflects light to a desired location.

20 Claims, 2 Drawing Sheets

MICRO-MIRROR AND METHOD

TECHNICAL FIELD OF THE INVENTION

This invention relates in general to image display systems, and more particularly to a micro-mirror and method.

BACKGROUND OF THE INVENTION

Light processing systems often involve directing light towards a display such that an image is produced. One way of effecting such an image is through the use of digital micro-mirror devices (DMD) available from Texas Instruments. In general, light is shined on a DMD array having numerous micro-mirrors. Each micro-mirror is selectively controlled to reflect the light towards a particular portion of a display, such as a pixel. The angle of a micro-mirror can be changed to switch a pixel to an "on" or "off" state. The micro-mirrors can maintain their "on" or "off" state for controlled display times.

The movement of micro-mirrors to reflect light towards or away from a particular portion of a display has conventionally been done in free space, requiring electrodes to apply strong forces to pull or push the micro-mirror in a desired direction. The mirrors are tilted until they touch a stop or a spring tip. In some cases, the mirrors can "stick" to the stops or spring tips reducing performance characteristics and requiring high voltages to be applied to electrodes to "unstick" them.

SUMMARY OF THE INVENTION

According to one embodiment of the present invention a method of reflecting light is disclosed including providing an element having a surface having an edge on which the element is capable of rolling and selectively reflecting light by rolling the surface such that a reflective element associated with the surface selectively reflects light to a desired location.

In another embodiment, a digital micro-mirror device is disclosed including a plurality of elements having a surface having an edge each element including a first electrode and a second electrode located beneath the surface wherein the first electrode is operable to receive a first voltage and wherein the second electrode is operable to receive a second voltage and wherein each surface is caused to roll on the edge by the difference between the first voltage and second voltage.

Certain embodiments may provide a number of technical advantages. For example, a technical advantage of one embodiment may include the capability to provide a decreased power usage by a digital micro-mirror device (DMD). Another technical advantage of another embodiments may include the reduction of mirror sticking. Other technical advantages of other embodiments may include manufacturing simplication.

Although specific advantages have been enumerated above, various embodiments may include all, some, or none of the enumerated advantages. Additionally, other technical advantages may become readily apparent to one of ordinary skill in the art after review of the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS

It should be understood at the outset that although example implementations of embodiments of the invention are illustrated below, the present invention may be implemented using any number of techniques, whether currently known or in existence. The present invention should in no way be limited to the example implementations, drawings, and techniques illustrated below. Additionally, the drawings are not necessarily drawn to scale.

Figure 1:
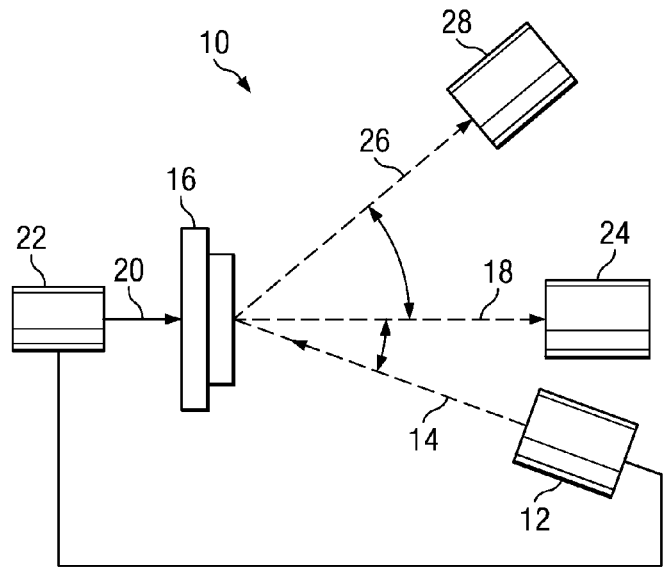
FIG. 1 is a block diagram of one embodiment of a portion of a display system.

FIG. 1 is a block diagram of one embodiment of a portion of a display system 10. In this example, display system 10 includes a light source module 12 capable of generating illumination light beams 14. Light beams 14 are directed from light source module 12 to a modulator 16. Modulator 16 may comprise any device capable of selectively communicating at least some of the received light beams along a projection light path 18. In the illustrated embodiment, modulator 16 comprises a digital micro-mirror device (DMD).

As will be described in more detail below, a DMD is a micro electro-mechanical device comprising an array of hundreds of thousands of tilting digital micro-mirrors. In a flat state, each micro-mirror may be substantially parallel to projection lens 24. From the flat state, the micro-mirrors may be tilted, for example, to a positive or negative angle corresponding to an "on" state and an "off" state. For discussion purposes, the angle at which the mirrors may tilt will be measured from projection path 18 and may be designated as theta. In particular embodiments, the micro-mirrors may tilt from +10 degrees to a −10 degrees. In other embodiments, micro-mirrors may tilt from a +12 degrees to a −12 degrees. To permit the micro-mirrors to tilt, each micro-mirror attaches to one or more hinges mounted on support posts, and spaced by means of an air gap over underlying control circuitry. The control circuitry provides the desired voltages to electrodes, based at least in part on image data 20 received from a control module 22. In various embodiments, modulator 16 is capable of generating various levels or shades for each color received.

The electrostatic forces cause each micro-mirror to selectively tilt. Incident illumination light on the micro-mirror array is reflected by the "on" micro-mirrors along projection path 18 for receipt by projection lens 24. Additionally, illumination light beams 14 are reflected by the "off" micro-mirrors and directed on off-state light path 26 toward light dump 28. The pattern of "on" versus "off" mirrors (e.g., light and dark mirrors) forms an image that is projected by projection lens 24. As used in this document, the terms "micro-mirrors" and "pixels" are used inter-changeably.

Light source module 12 includes one or more lamps or other light sources capable of generating and focusing an illumination light beam. Although display system 10 is described and illustrated as including a single light source module 12, it is generally recognized that display system 10 may include any suitable number of light sources modules appropriate for generating light beams for transmission to modulator 16.

As discussed above, display system 10 includes a control module 22 that receives and relays image data 20 to modulator 16 to effect the tilting of micro-mirrors in modulator 16. Specifically, control module 22 may relay image data 20 that identifies the appropriate tilt of the micro-mirrors of modulator 16. For example, control module 22 may send image data 20 to modulator 16 that indicates that the micro-mirrors of modulator 16 should be positioned in the "on" state.

Figure 2:
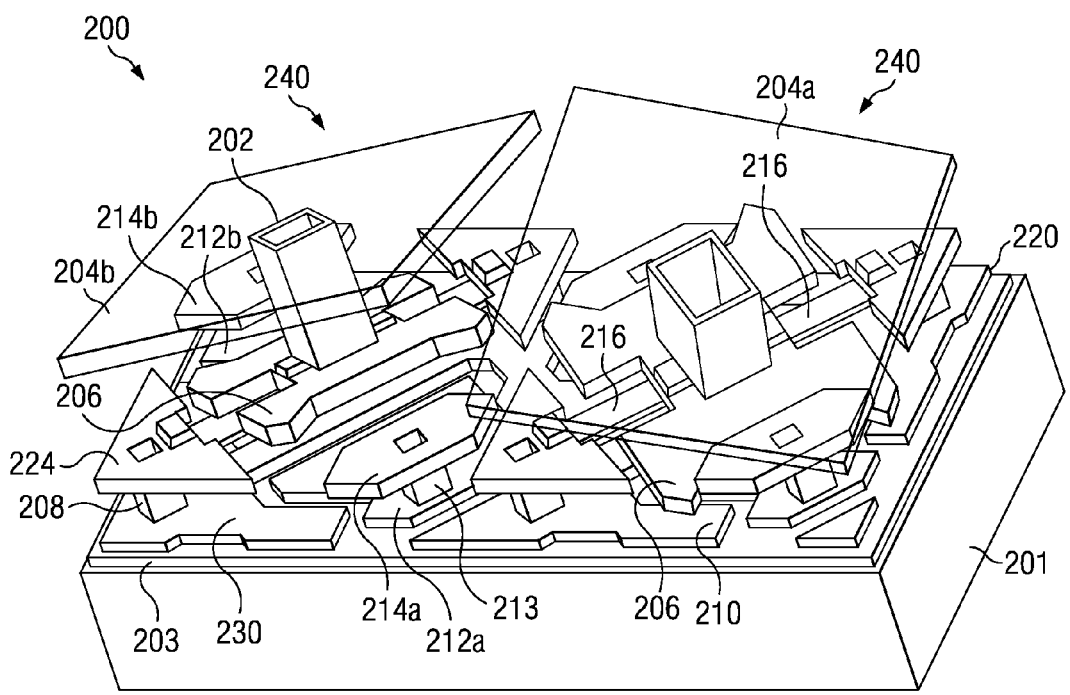
FIG. 2 illustrates an example configuration of a conventional digital micro-mirror device (DMD) pixel element.

FIG. 2 illustrates an example configuration of a conventional DMD pixel element 200. As discussed above with regard to modulator 16 of FIG. 1, DMD 200 may include an array of hundreds of thousands of tilting digital micro-mirrors. Each micro-mirror may be on an individually addressable DMD pixel element 240. Although DMD 200 includes many of such DMD pixel elements 240, for illustration purposes, only two DMD pixel elements 240 are shown in FIG. 2.

Each DMD pixel element 240 may generally include a superstructure cell fabricated monolithically over a complementary metal-oxide semiconductor ("CMOS") substrate 201. In particular embodiments, the CMOS substrate 201 includes component parts of control circuitry operable to manipulate the DMD pixel element 240. For example, the CMOS substrate 201 may include an SRAM cell or other similar structure for performing the operations of DMD pixel element 240. Each DMD pixel element 240 may generally include a mirror portion, a hinge portion, and an address portion.

The mirror portion of the DMD pixel elements 240 in the illustrated embodiment uses a reflective material such as aluminum or other material to reflect incident light to produce an image through projection lens 24. In some embodiments, the reflective material may be a micro-mirror 204. In particular embodiments, the micro-mirror 204 may be approximately 13.7 microns in size and have approximately a one micron gap between adjacent micro-mirrors. The described dimensions, however, are merely one example configuration of micro-mirrors 204. It is generally recognized that, in other embodiments, each micro-mirror 204 may be smaller or larger than the above described example. For example, in particular embodiments, each micro-mirror may be less than thirteen microns in size. In other embodiments, each micro-mirror may be approximately seventeen microns in size.

The micro-mirrors 204 are generally supported above the hinge 216 by a mirror via 202. In the illustrated embodiment, the range of motion given to micro-mirrors 204 may be limited by a yoke 206. Thus, micro-mirrors 204 may be tilted in the positive or negative direction until the yoke 206 (coupled to or integrated with the hinge 216) contacts a contact point 210 of a bias pad 230. In addition, it is generally recognized that micro-mirrors 204 may tilt in the positive or negative direction until the micro-mirrors 204 contact a mirror stop or spring tip (shown and described in more detail with regard to FIGS. 3B-3C).

The address portion of the DMD pixel elements 240 includes a pair of address pads 212a, 212b and address electrodes 214a, 214b. Address vias 213 may generally couple the address electrodes 214a, 214b to a portion of the address pads 212a, 212b. The address electrodes 214a, 214b that carry a control or address voltage are in closer proximity to the micro-mirrors 204 when the mirrors tilt. Further details of the control or address voltage are described below.

With respect to FIG. 2, the address pads 212a, 212b and the bias pad 210 are formed within a conductive layer 220 (also referred to sometimes as a Metal 3 or M3 layer). The conductive layer 220 is disposed outwardly from an oxide layer 203, which operates as an insulator. For example, the oxide layer 203 may at least partially insulate CMOS substrate 201 from address pads 212a, 212b and bias pad 210. As another example, the oxide layer 203 may additionally or alternatively operate to at least partially insulate the address electrodes 212a, 212b from the bias pad 230.

As described above, CMOS substrate 201 comprises control circuitry associated with DMD 200. The control circuitry may comprise any hardware, software, firmware, or combination thereof capable of at least partially contributing to the creation of the electrostatic forces between the address portions (e.g., the address pad 212 and the address electrodes 214) and the micro-mirrors 204 and/or the address portions and the yoke 206. The control circuitry associated with CMOS substrate 201 functions to selectively transition micro-mirrors 204 between "on" and "off" states based at least in part on data received from a controller or processor (shown in FIG. 1 as reference numeral 22).

The illustrated example embodiment includes two micro-mirrors 204 disposed adjacent to one another. Micro-mirror 204a may represent a micro-mirror in the active "on" state condition. Conversely, micro-mirror 204b may represent a micro-mirror in the active "off" state condition. Thus, the control circuitry associated with CMOS substrate 201 transitions micro-mirrors 204 between "on" and "off" states by selectively applying an address or control voltage to at least one of the address electrodes 212a, 212b associated with a particular micro-mirror 204. The control voltage is on the order of approximately three volts. Accordingly, to transition micro-mirror 204b, for example, to the active "on" state condition, the control circuitry removes the control voltage from electrode 212a (reducing, for example, electrode 212a from three volts to zero volts) and applies the control voltage to electrode 212b (increasing, for example, electrode 212b from zero volts to three volts) while the micro-mirror receives reset voltages. During such activity, at least a portion of an electrostatic force (or voltage differential) may be created between the yoke 206 and the address electrode 212a. Similarly, another portion of an electrostatic force may be created between the micro-mirror 204a and the elevated address electrode 214a. The combination of the electrostatic forces may selectively create a torque force that transitions the micro-mirror 204b to the active "on" state. Although a control voltage of three volts is described above, a control voltage of three volts is merely one example of a control voltage that may be selectively applied to address electrodes 212a, 212b.

By combining the DMD 200 with a suitable light source and projection optics (described above with regard to FIG. 1), the micro-mirror 240 may reflects incident light either into or out of the pupil of the projection lens 24. Thus, the "on" state of the DMD pixel element 240 appears bright and the "off" state of the DMD pixel element 240 appears dark. Gray scale may be achieved by binary pulse width modulation of the incident light. Color may be achieved by using color filters, either stationary or rotating, in combination with one, two, or three DMDs 200.

Figure 3A:
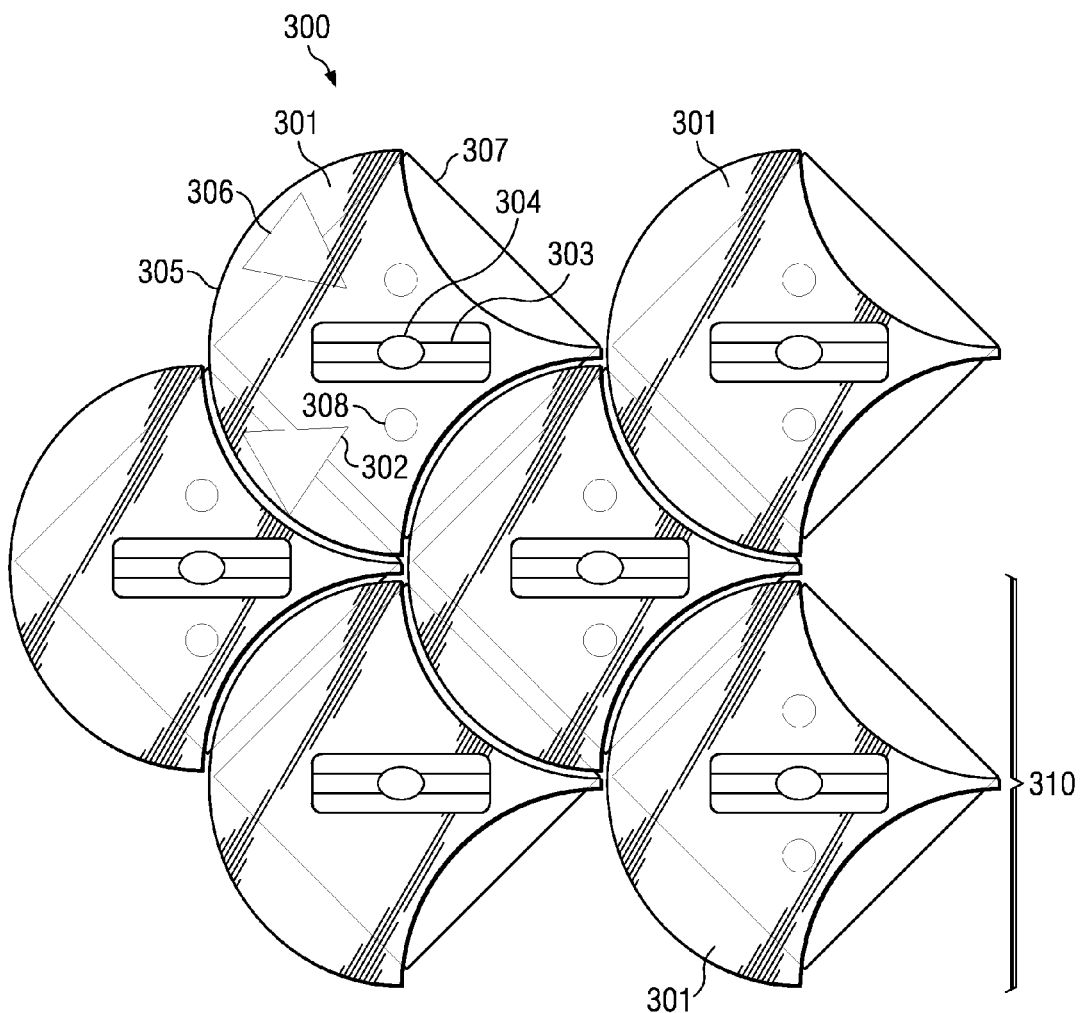
FIG. 3A illustrates a configuration of a digital micro-mirror device (DMD) pixel element where the micro-mirror is cycloid shaped.

In reference to FIG. 3A, in some embodiments in accordance with the present invention, DMD 300 can include elements having surfaces which in the illustrated embodiment are cycloid shaped micro-mirrors 301. Beneath each micro-mirror are electrodes 302, which can be located on opposite sides of hinge 303. Electrodes 302 and 306 are explicitly illustrated for only one micro-mirror 301 for clarity of illustration, but it should be understood that each of micro-mirrors 301 may have associated electrodes 302 and 306. Hinge 303 can be connected to each micro-mirror by via 304. In some embodiments, the DMD configuration of FIG. 3A allows the tilting of the cycloid shaped micro-mirror by rolling the mirror on its edge 305. Also shown in FIG. 3A are rectangular-shaped micromirrors 307, described in greater detail below. The amount and direction of roll can be used as an "on" or "off" state for each micro-mirror in the same way as the tilting described with respect to FIGS. 1 and 2. In an "on" state, for instance, a mirror is rolled so that light is reflected to a desired point.

The rolling can be accomplished in a number of ways. When no voltage is applied to electrodes 302 and 306, micro-mirror 301 can be parallel to the substrate surface of the DMD 300. However, in some embodiments, one voltage is applied to electrode 302 and another voltage is applied to electrode 306 and electrostatic forces from the charged electrodes pull the micro-mirror 301 until its edge 305 touches the surface of DMD 300. The difference in voltage between electrodes 302 and 306 can be used to dictate the "on" or "off" state of micro-mirror 301. For instance, in some embodiments, when a greater voltage is applied to electrode 306 as compared to electrode 302, the micro-mirror 301's attraction to electrode 306 will be greater, causing the micro-mirror to roll towards electrode 306 and away from electrode 302. To roll the micro-mirror in the opposite direction towards electrode 302, a greater voltage is applied to electrode 302 than to electrode 306.

Figure 3B:
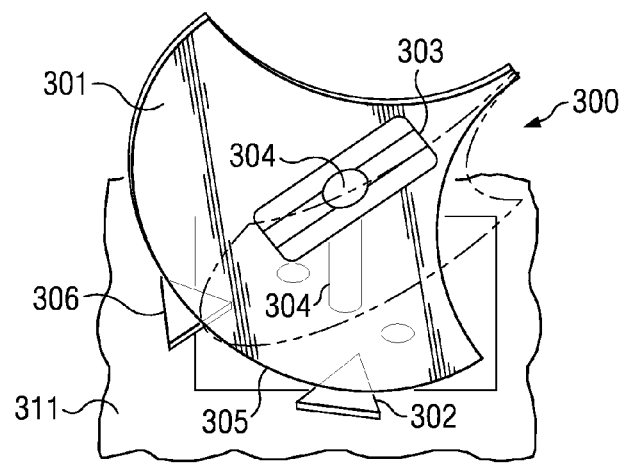
FIG. 3B illustrates a side view of a configuration of a DMD pixel element where the micro-mirror is cycloid shaped.

In reference to FIG. 3B, a side a view of one embodiment is shown. In this view, a voltage is being applied to electrode 302. As a result, edge 305 of micro-mirror 301 is pulled into contact with the substrate 311. In addition, the micro-mirror 301 is rolled toward electrode 302 as a result of a greater voltage being applied to electrode 302 as compared to electrode 306 located opposite of electrode 302.

As described above with regard to FIG. 1, in some embodiments, the electrodes 302 and 306 may operate to roll micro-mirrors 301 from a plus ten degrees to a minus ten degrees to alternate the micro-mirrors 301 between the active "on" state condition and the active "off" state condition, respectively. In other example embodiments, however, electrodes 302 and 306 may operate to roll micro-mirrors 301 from a plus twelve degrees to a minus twelve degrees to alternate the micro-mirrors 301 between the active "on" state and the active "off" state, respectively. Further, micro-mirror 301 can also be positioned to provide more than two states ("on" or "off") such that multiple light bearing from different sources may be turned "on" or "off" by the same micro-mirror, resulting in a tri-state or quad-state (or higher state) micro-mirror.

In some embodiments, rectangular shaped micro-mirrors 307 can be placed above the cycloid shaped surface 301 and attached to the cycloid shaped surface 301 using vias 308. In these embodiments, the cycloid shaped surface can be non-reflective and the rectangular micro-mirror attached above it can be reflective. In this way, the rectangular pixel shapes 204 of FIG. 2 can used in pixels where "on" and "off" states are determined through rolling the pixel on an edge.

In some embodiment, the rolling of the micro-mirror along its edge reduces the sticking experienced with tilting the micro-mirror in free space that can be associated with some embodiments of FIG. 2. In the system of FIG. 2, spring tips or stops are used to stop the micro-mirror 200 when the mirror reaches a fully tilted position. The micro-mirror can stick to the spring tip when fully tilted however, resulting in decreased performance and requiring large voltages to be applied to electrodes to unstick them. In some embodiments of the present invention, however, the contact forces between the edge of the micro-mirror and the substrate are minimal, requiring much less force to roll the micro-mirror. In addition, spring tips or stops would not be needed and can be eliminated from the pixel elements, simplifying manufacturing. In addition, the rolling action used to tilt the micro-mirrors can require less work than supporting and tilting the micro-mirrors in free space. As a result, in some embodiments, the voltages and energy required by the electrodes to roll the micro-mirrors may be significantly less.

By combining the DMD 300 with a suitable light source and projection optics (described above with regard to FIG. 1), the micro-mirror 301 may reflect incident light either into or out of the pupil of the projection lens 24 (or incorporate states of operation greater than two). Thus, the "on" state of the DMD pixel element 310 appears bright and the "off" state of the DMD pixel element 310 appears dark. Gray scale may be achieved by binary pulse width modulation of the incident light. Color may be achieved by using color filters, either stationary or rotating, in combination with one, two, or three DMDs 300.

The pixels of the present invention may employ all, some, or none of the features or components within the hinge portion, the address portion, and the mirror portion discussed and illustrated in FIGS. 1-3B.

Numerous other changes, substitutions, variations, alterations, and modifications may be ascertained to one skilled in the art and it is intended that the present invention encompass all such changes, substitutions, variations, alterations, and modifications as falling within the scope of the appended claims. For example, it will be understood that although a particular embodiment may show cycloid-shaped micro-mirrors, other shapes may be used for positioning micro-mirrors by rolling.

What is claimed is:

1. A micro-mirror element comprising:
   a cycloid shaped surface comprising an edge; and
   electrodes located beneath the surface operated to cause the cycloid shaped surface to roll on its edge.

2. The micro-mirror element of claim 1 wherein the cycloid shaped surface is a cycloid shaped micro-mirror.

3. The micro-mirror element of claim 1 further comprising:
   a substrate layer; and
   a hinge wherein the hinge is located between the substrate layer and the surface and is connected to the substrate layer by a via and to the surface by a via.

4. The micro-mirror element of claim 1 further comprising:
   a rectangular shaped micro-mirror wherein the rectangular shaped micro-mirror is attached above the surface by vias.

5. The micro-mirror element of claim 1, wherein the electrodes are located on opposite sides of the micro-mirror.

6. A method of reflecting light comprising:
   providing an element having a surface having an edge; and
   selectively reflecting light by rolling the surface on the edge such that a reflective element associated with the surface selectively reflects light to a desired location.

7. The method of claim 6 wherein the surface is caused to roll by first and second electrodes applying electrostatic forces to the element.

8. The method of claim 6 wherein the surface is a reflective surface that comprises the reflective element.

9. The method of claim 6 wherein the reflective element is coupled to the surface.

10. The method of claim 6 wherein the reflective element is rectangular and is coupled to the surface.

11. The method of claim 6 wherein the surface is cycloid shaped.

12. The method of claim 6 further comprising:
    applying a first voltage to a first electrode and a second voltage to a second electrode; and controlling the amount of roll of the surface using the difference between the first voltage and second voltage.

13. A digital micro-mirror device comprising:

a plurality of elements having a surface having an edge each element including a first electrode and a second electrode located beneath the surface wherein the first electrode is operated to receive a first voltage and wherein the second electrode is operated to receive a second voltage and wherein each surface is caused to roll on the edge by the difference between the first voltage and second voltage.

14. The micro-mirror device of claim 13 wherein the surface is cycloid shaped.

15. The micro-mirror device of claim 13 wherein the surface is reflective.

16. The micro-mirror device of claim 13 further comprising:

a substrate layer; and a plurality of hinges wherein each hinge is located between the substrate layer and a surface and is connected to the substrate layer with a via and to a surface with a via.

17. The micro-mirror device of claim 13 further comprising:

a plurality of rectangular shaped micro-mirrors wherein each rectangular shaped micro-mirror is located above a respective surface of a respective element.

18. The micro-mirror device of claim 13, wherein first and second electrodes are located on opposite sides of each surface.

19. The micro-mirror device of claim 13, wherein the position of the surface of the element indicates a state of the element.

20. The micro-mirror device of claim 19, wherein the state of the element includes an on and an off state.

* * * * *